US011598271B1

(12) United States Patent
Klingbeil et al.

(10) Patent No.: US 11,598,271 B1
(45) Date of Patent: Mar. 7, 2023

(54) METHODS AND SYSTEMS FOR A MULTI-PRESSURE FUEL INJECTION SYSTEM

(71) Applicant: Transportation IP Holdings, LLC, Norwalk, CT (US)

(72) Inventors: Adam Edgar Klingbeil, Ballston Lake, NY (US); Thomas Michael Lavertu, Ballston Lake, NY (US); Eric Dillen, Edinboro, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/645,014

(22) Filed: Dec. 17, 2021

(51) Int. Cl.
*F02D 19/02* (2006.01)
*F02D 19/06* (2006.01)
*F02D 19/08* (2006.01)

(52) U.S. Cl.
CPC ..... *F02D 19/0605* (2013.01); *F02D 19/0628* (2013.01); *F02D 19/0644* (2013.01); *F02D 19/0665* (2013.01); *F02D 19/0678* (2013.01); *F02D 19/0684* (2013.01); *F02D 19/081* (2013.01); *F02D 2200/0602* (2013.01)

(58) Field of Classification Search
CPC .............. F02D 19/022; F02D 19/0605; F02D 19/0628; F02D 19/0644; F02D 19/0689; F02D 19/0692; F02D 19/081; F02D 2200/0602

USPC ................................................. 123/304, 431
See application file for complete search history.

(56) References Cited

U.S. PATENT DOCUMENTS

| | | | | |
|---|---|---|---|---|
| 6,655,324 | B2 * | 12/2003 | Cohn .................... | F02M 25/10 123/304 |
| 8,516,991 | B2 * | 8/2013 | Tanno .................. | F02D 35/028 123/304 |
| 2003/0089337 | A1 * | 5/2003 | Cohn ...................... | F02B 1/12 123/568.11 |
| 2012/0174891 | A1 * | 7/2012 | Marriott ............. | F02D 19/0647 123/299 |
| 2015/0053180 | A1 * | 2/2015 | Pursifull ............ | F02M 21/0212 123/445 |
| 2015/0059687 | A1 * | 3/2015 | Glugla ............... | F02D 41/3845 123/304 |
| 2015/0354492 | A1 * | 12/2015 | Surnilla .................. | F02D 37/02 123/406.47 |
| 2016/0010569 | A1 * | 1/2016 | Dunn .................. | F02D 19/0689 123/304 |

FOREIGN PATENT DOCUMENTS

EP        1378644 A2 *   1/2004   ............... F02B 1/12

* cited by examiner

*Primary Examiner* — Erick R Solis
(74) *Attorney, Agent, or Firm* — McCoy Russell LLP

(57) ABSTRACT

Various methods and systems are provided for a method for a multi-pressure fueling system. In one example, the multi-pressure fueling system includes providing a first fuel delivery pressure enabling high pressure direct injection of a fuel at a first injector and a second fuel delivery pressure insufficient for high pressure direct injection, at a second injector, based on engine operation.

17 Claims, 10 Drawing Sheets

METHODS AND SYSTEMS FOR A MULTI-PRESSURE FUEL INJECTION SYSTEM

BACKGROUND

Technical Field

Embodiments of the subject matter disclosed herein relate to fuel injection at an engine.

Discussion of Art

Vehicles, such as rail vehicles and other off-highway vehicles, may rely on combustion of one or more fuels at an internal combustion engine. At least one of the fuels may be an alternative fuel, e.g., an alternative to petroleum-derived fuels, such as hydrogen. As a combustion fuel, hydrogen is an attractive candidate for at least partial substitution of conventional fuels due to its combustion characteristics and energy content. For example, hydrogen has a high laminar flame speed and a wider flammability range than, for example, gasoline. Furthermore, hydrogen has a higher gravimetric energy density than any known fuel.

Hydrogen may be delivered to the engine by port injection, which injects the hydrogen at relatively low pressure and allows the hydrogen to mix with air prior to combustion (e.g., pre-mixing). Port injection of hydrogen offers high in-cylinder peak pressure compared with other injection techniques, the high in-cylinder peak pressure associated with high engine power output and efficiency. Pre-mixing of hydrogen and air during engine operation at high loads, however, may promote undesirable side reactions, leading to an increased likelihood of auto-ignition, pre-ignition and knock. Furthermore, for engines that can combust hydrogen as a secondary fuel, occurrence of auto-ignition and pre-ignition may be exacerbated as a hydrogen substitution ratio is increased, thereby constraining a potential for hydrogen substitution to suppress release of carbon emissions.

Alternatively, direct injection of hydrogen at the engine allows contact between hydrogen and air to be delayed until immediately prior to ignition. Hydrogen may therefore burn as a diffusion flame and pre-ignition may be mitigated. For hydrogen to be direct injected, a mechanism for injecting hydrogen at high pressure is demanded. For example, pumps for increasing pressure at a fuel reservoir may be used but such devices are prone to poor efficiency and reliability. As another example, hydrogen gas may be stored in a tank at high pressure. Initially, a pressure of tank may be sufficiently high to enable direct injection of hydrogen at the engine. However, the tank pressure eventually decreases below a minimum pressure level demanded for injection at high pressure. An efficient and robust strategy for providing hydrogen to the engine at pressures enabling direct injection is therefore desirable.

BRIEF DESCRIPTION

In one embodiment, a method for an engine includes providing a first fuel delivery pressure enabling high pressure direct injection of a fuel to first fuel injector and a second fuel delivery pressure, insufficient for high pressure direct injection, at a second fuel injector, based on engine operation. In this way, high pressure direct injection of the fuel, such as hydrogen, at the engine is enabled, thereby decreasing a likelihood of knock during combustion of hydrogen and enabling higher substitution ratios of hydrogen for a carbon-based fuel.

In one example, a multi-fuel pressure system may be implemented at a vehicle having a hydrogen-burning engine to allow hydrogen to be injected at pressures demanded for high pressure direct injection (HPDI) as well as lower pressures suitable for low pressure direct injection (LPDI) and port injection (PI). The dual fuel pressure system may utilize various strategies and mechanisms for maintaining a delivery pressure of hydrogen at the engine sufficiently high for HPDI when HPDI is requested. As such, combustion stability may be enhanced while carbon emissions may be decreased during engine operation.

DETAILED DESCRIPTION

Figure 1:
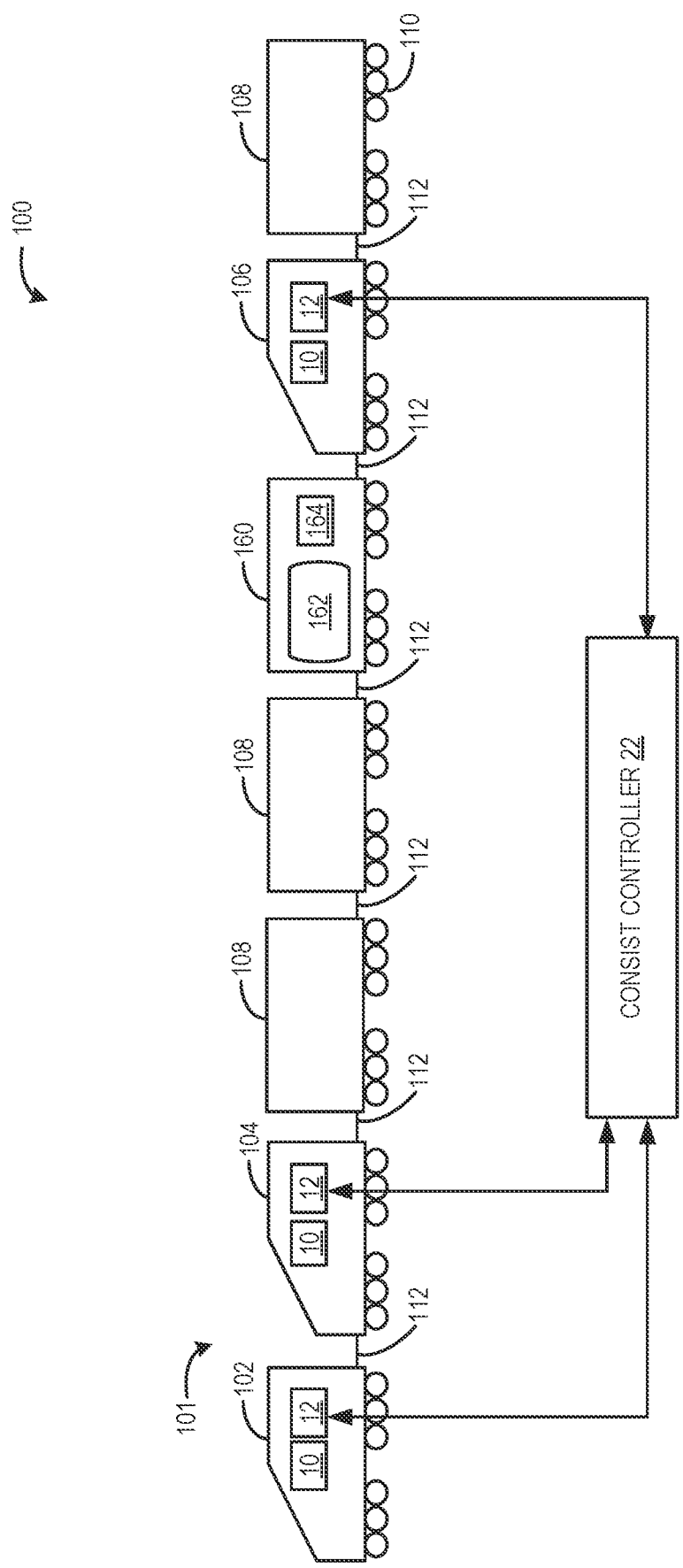
FIG. 1 shows an example embodiment of a train including a locomotive consist.
Figure 2:
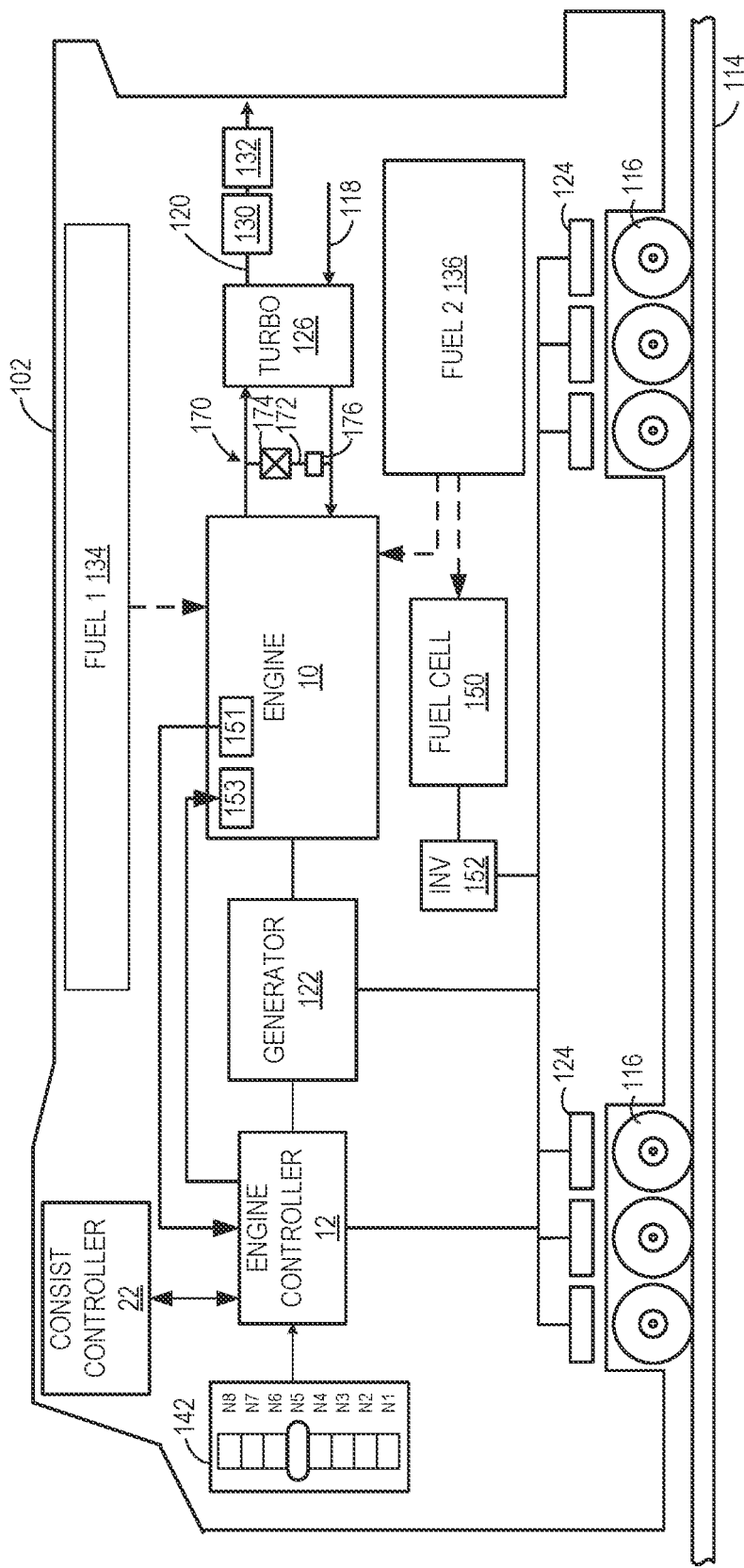
FIG. 2. shows a schematic diagram of an example embodiment of a locomotive from FIG. 1 with a dual fuel engine configured to combust hydrogen.
Figure 3:
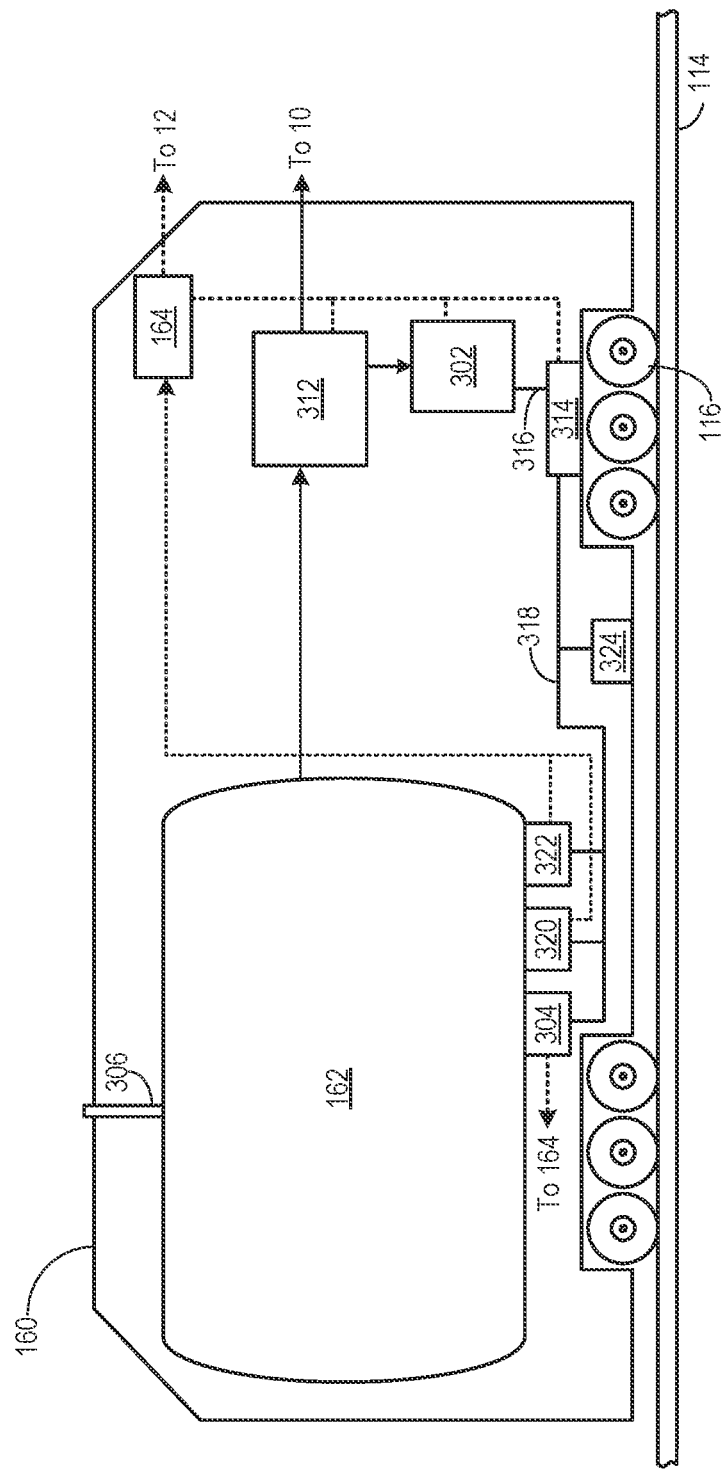
FIG. 3 shows an example embodiment of a fuel tender which may be included in the train of FIG. 1.
Figure 7:
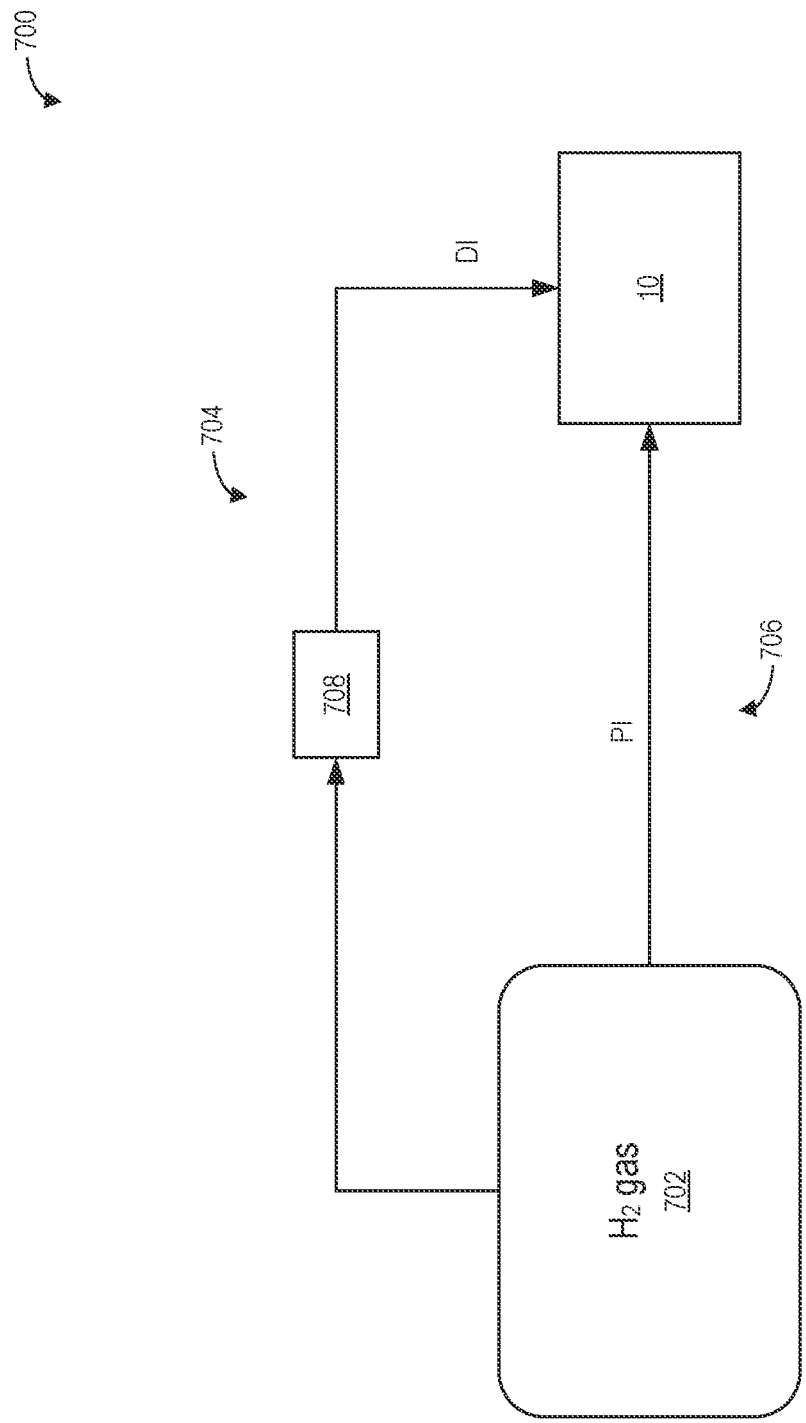
FIG. 7 shows a third example of a fuel reservoir enabling the dual pressure fueling system to be used for injection of hydrogen.
Figure 8:
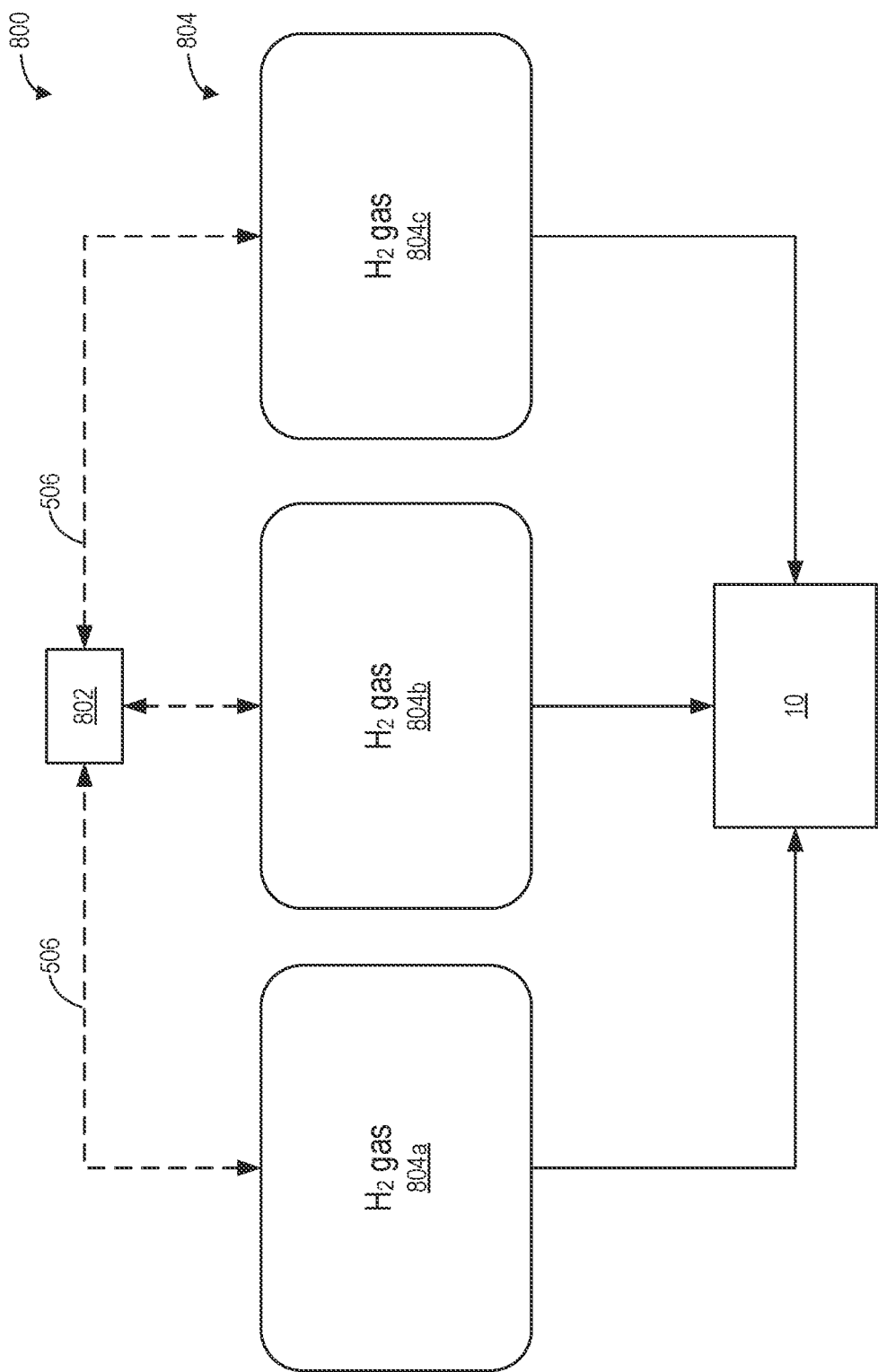
FIG. 8 shows a fourth example of a fuel reservoir enabling the dual pressure fueling system to be used for injection of hydrogen.
Figure 9:
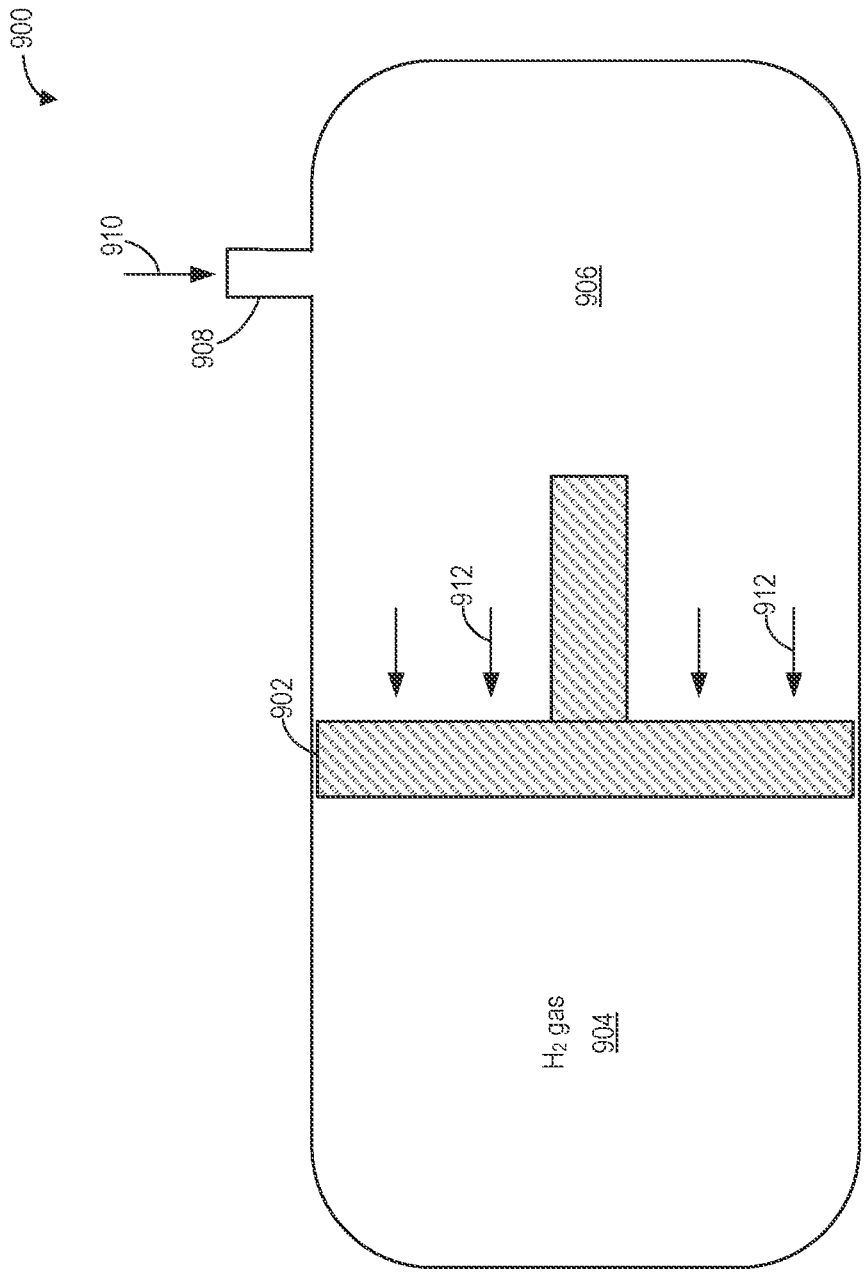
FIG. 9 shows an example of a fuel storage tank adapted with a pressure increase mechanism.
Figure 10:
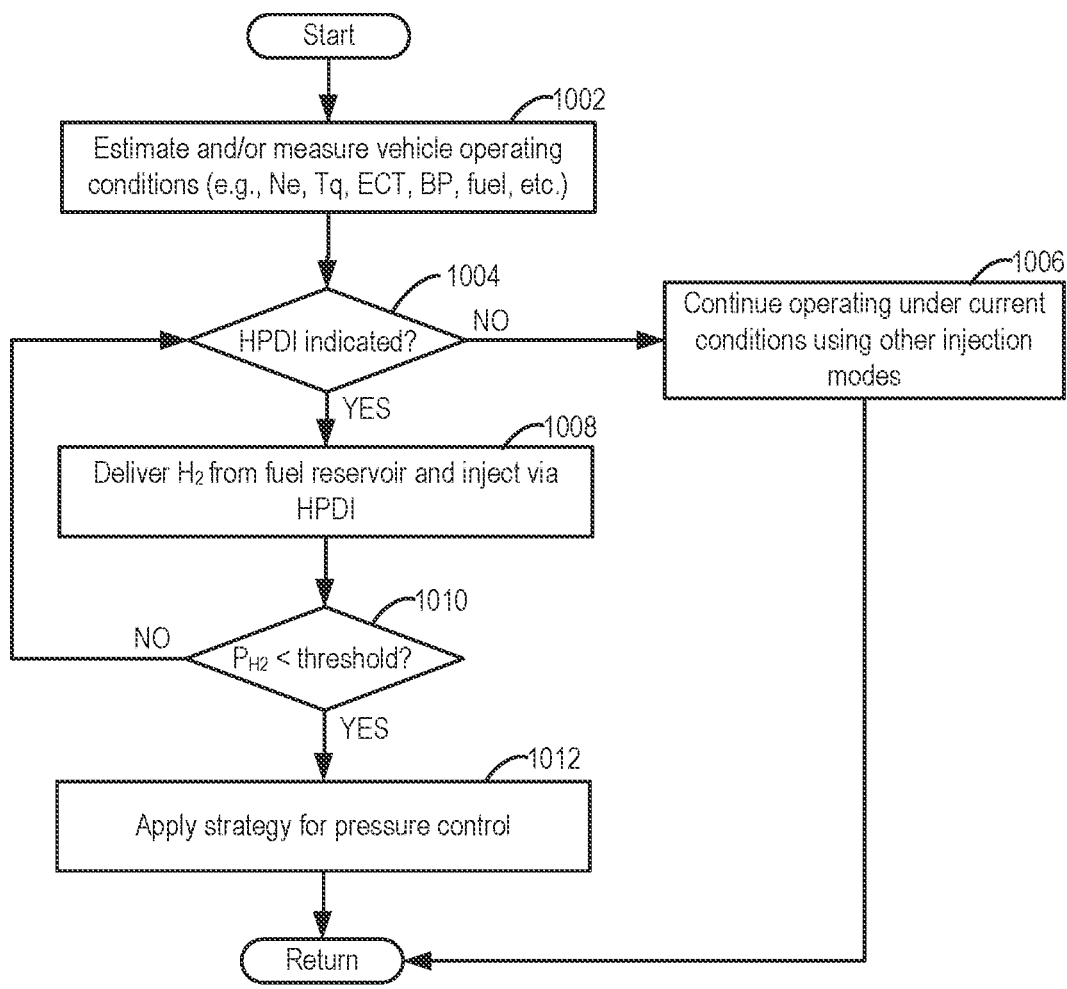
FIG. 10 shows an example of a method for operating an engine configured to inject hydrogen via more than one injection mode.

The following description relates to a system and method for fuel injection at a vehicle engine. The description relates to a multi-pressure fueling system for fuel injection at the engine. This may enable a fuel, such as hydrogen, to be combusted via more than one injection mode. As one example, the engine may combust one or more types of fuel where one of the fuels is gaseous. Gaseous fuels may include hydrogen, natural gas, and ammonia. The engine may be included in a vehicle. The vehicle may be part of a vehicle group, such a consist, as depicted in FIG. 1. An example of one of the vehicles adapted with the engine is illustrated in FIG. 2 and a fuel tender that may store one or more fuels combusted by the engine is shown in FIG. 3. Hydrogen may be delivered to the engine via a dual pressure fueling system that provides fuel at low pressure for port injection or at higher pressures for direct injection. A hydrogen delivery pressure may be modulated based on storage pressures at a fuel reservoir of the vehicle. Examples of fuel reservoirs enabling both high and low pressure injection of hydrogen for combustion are illustrated in FIGS. 5-8. Additional strategies for maintaining sufficiently high pressures in a storage tank are addressed with reference to FIG. 9, depicting an example of a storage tank adapted with a mechanism for maintaining tank pressure sufficiently high for high pressure direction injection (HPDI) of hydrogen. An example of a method for operating an engine that may receive fuel at more than one pressure for injection is shown in FIG. 10.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, and other off-highway vehicles (OHV). On-road vehicles can include automobiles, buses, and semi-trucks. Off road vehicles can include mining equipment, marine vessels, rail vehicles, agricultural vehicles, and the like. For clarity of illustration, a locomotive is provided as an example of a mobile platform supporting a system incorporating an embodiment of the invention.

Before further discussion of the methods for decreasing carbon-based emissions via direct injection of a non-carbon-emitting fuel, an example platform in which the methods may be implemented is shown. FIG. 1 depicts an example train 100, including a plurality of rail vehicles 102, 104, 106, a fuel tender 160, and cars 108, that can run on a track 114. The plurality of rail vehicles, the fuel tender, and the cars are coupled to each other through couplers 112. In one example, the plurality of rail vehicles may be locomotives, including a lead locomotive and one or more remote locomotives. While the depicted example shows three locomotives and four cars, any appropriate number of locomotives and cars may be included in the train. Further, the locomotives in the train may form a consist. For example, in the embodiment depicted, the locomotives may form consist 101. Various vehicles may form vehicle groups (such as consists, convoys, swarms, fleets, platoons, and the like). The vehicles in a group may be coupled together mechanically and/or virtually.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example.

The locomotives may be powered by an engine 10 while the cars may be unpowered. In one example, the engine may be a multi-fuel engine. For example, the engine may combust gaseous and/or liquid fuels with different amounts of carbon, and in varying ratios of the fuels relative to each other. In some examples, the multi-fuel engine may be specifically a dual-fuel engine to combust two fuels, either of which may be a gaseous or liquid fuel that is hydrocarbon or non-hydrocarbon based. In other examples, the engine may be a single-fuel engine that can combust a gaseous or a liquid fuel.

The train may include a control system. The control system may include at least one engine controller 12, and it may include at least one consist controller 22. As depicted in FIG. 1, each locomotive includes an engine controller. The engine controller may be in communication with the consist controller. The consist controller may be located on one vehicle of the train, such as the lead locomotive, or may be remotely located, for example, at a dispatch center. The consist controller may receive information from, and transmit signals to, each of the locomotives of the consist. For example, the consist controller may receive signals from a variety of sensors on the train and adjust train operations accordingly. The consist controller is also coupled to each engine controller for adjusting engine operations of each locomotive. As elaborated with reference to FIG. 10, each engine controller may command injection of fuel to the engine of each locomotive according to a delivery and storage configuration of a fuel system supplying the fuel. Fuel delivery and storage strategies described herein may enable efficient combustion of hydrogen with decreased likelihood of pre-ignition, auto-ignition, and knock during engine operation.

The train may include at least one fuel tender, which may carry one or more fuel storage reservoirs 162 and includes a controller 164. While the fuel tender is positioned in front of the remote locomotive 106, other examples may include alternate locations of the fuel tender along the train. For example, the fuel tender may be instead positioned behind the remote locomotive or between the lead locomotive and the remote locomotive, or behind the remote locomotive.

In one example, the fuel tender may be un-powered, e.g., without an engine or electric traction motors (e.g., electric traction motors 124 shown in FIG. 2). However, in other examples, the fuel tender may be powered for propulsion. For example, as shown in FIG. 2, the fuel tender may include an engine. The engine of the fuel tender may combust the fuel stored in the fuel storage reservoir and/or fuel stored at another vehicle of the train.

The fuel storage reservoir may have a suitable structure for storing a specific type of fuel. In one example, the fuel storage reservoir may be adapted for cryogenic storage of liquefied natural gas (LNG) or liquefied hydrogen. As another example, the fuel storage reservoir may be used to store a fuel in a liquid state at ambient temperature and pressure, such as diesel or ammonia. In yet another example, the fuel storage reservoir may store a fuel as a compressed gas, such as hydrogen or natural gas. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, fuel may be stored both at the fuel tender and at one or more of the locomotives, e.g., as shown in FIG. 2. In addition, in some instances, the fuel tender may store a fuel cell system, including a fuel cell and one or more tanks of compressed hydrogen gas. Alternatively, the fuel cell system may be stored at one or more of the locomotives, as shown in FIG. 2.

FIG. 2 depicts an example embodiment of a locomotive as part of a train that can run on the track 114 via a plurality of wheels 116. Power for propulsion of the locomotive may supplied at least in part by the engine. The engine receives intake air for combustion from an intake passage 118. The intake passage receives ambient air from an air filter (not shown) that filters air from outside of the locomotive. Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine. In another embodiment, the engine operates as a spark ignition engine. The engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual-fuel engine. As depicted in FIG. 2, the dual fuel engine may receive a first fuel from a first fuel reservoir 134 and a second fuel from a second fuel reservoir 136.

While the locomotive is equipped with two fuel reservoirs in FIG. 2, in other examples, the locomotive may include only one fuel reservoir or no fuel reservoir. For example, at least one of the fuel reservoirs may be stored at the fuel tender, e.g., the fuel tender 160 of FIG. 1. Alternatively, at least one additional fuel, e.g., a third fuel, may be stored at the fuel tender in addition to the first fuel at the first fuel reservoir and the second fuel at the second fuel reservoir of the locomotive. In one example, fuels which may be stored at ambient pressure and temperature without any additional equipment or specialized storage tank configurations, such as diesel, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., any fuels stored on-board the train) may each be any of a number of different fuel types. For example, the types of fuel may include hydrocarbon-based fuels, such as diesel, natural gas, methanol, ethanol, other alcohols, dimethyl ether (DME), other ethers, biodiesel, HDRD, syn-gas, etc. Alternatively, the fuels may be non-hydrocarbon-emitting fuels, such as hydrogen, ammonia, water, etc. The fuels listed above are non-limiting examples of fuels which may be combusted at the engine and various other types of fuels are possible.

Additionally, each of the stored fuels may be a gaseous or a liquid phase fuel. Thus, when configured as a compression ignition engine combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when configuration as a spark ignition engine combusting a single fuel type, the engine may also consume either a gaseous fuel or a liquid fuel. When configured as a multi-fuel spark ignition engine, the engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel. In some examples, the substitution rate may be set based on one or more conditions to increase an amount of carbon-free fuel to decrease carbon emissions. A ratio of carbon-free fuels used may be adjusted based on a desired ignition timing, wherein the desired ignition timing is based on one or more of an engine load, an intake manifold temperature and pressure, and a combustibility of the fuel mixture.

The engine, as the multi-fuel engine, may combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When the engine is the single fuel-combusting engine (either spark ignition or compression ignition), the engine may consume a single liquid phase fuel. For example, the engine may combust diesel, hydrogen, ammonia, LNG, or another liquid phase fuel. Similarly, the engine may combust a single gaseous fuel, such as hydrogen, or another gaseous fuel.

A fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one example, one or more of the fuels may be delivered to the engine cylinders via an indirect injection method, such as port injection. In another example, at least one of the fuels may be introduced to the engine cylinders via direct injection. In yet another example, at least one of the fuels may be injected by central manifold injection. The engine may receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing of the gaseous fuel may be desirable via port injection. The fuels may also be premixed when introduced by central manifold injection. Premixing by direct injection is possible, such as by injection of the gaseous fuel during an intake stroke of the engine cylinders. Additionally or alternatively, a location of injection of one or more fuels may be based on a combustibility of a fuel. For example, ammonia may be injected indirectly and premixed with boost air and/or EGR to enhance the combustibility and vaporization thereof.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be selectively injected by port injection or direct injection. Similarly, fuels such as methanol and ethanol may be either port injected or direct injected. In some instances, the engine may have fuel injectors capable of switching between injection of gaseous fuels and of liquid fuels.

The fuels combusted by the dual fuel engine may or may not be premixed prior to combustion whether the fuels are in the gas or liquid phases. For example, depending on operating conditions, premixing of hydrogen, natural gas, ammonia, methanol, ethanol, and DME may be desirable. For example, a greater magnitude of premixing hydrogen may be desired at higher loads and a lower magnitude of premixing hydrogen may be desired at lower loads. During other operating conditions, fuels such as diesel, hydrogen, natural gas, methanol, and ethanol may not be premixed. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidically coupled to a cylinder head where the fuel(s) may mix with air in the pre-combustion chamber before flowing to the cylinder head.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). When direct injected, the fuels may not be premixed, in one example. However, in another example, premixing may be enabled by direct injection of one or more of the fuels prior to a compression stroke of the engine cylinders, as described above.

For embodiments of the engine where the first fuel is hydrogen and the second fuel is diesel, premixing of the hydrogen with air, e.g., for any method of injection, may provide air/fuel mixtures with better combustion stability at low engine speeds, low engine torque, or high total air-to-fuel ratio (AFR), which may result in smoother engine startups. However, at higher engine speeds, higher engine torque, or lower AFR, port injection of the hydrogen may increase a likelihood of engine knock. Direct injection of the hydrogen may mitigate knock. Thus, in some examples, combined application of port injection of hydrogen at low engine speeds/torque and direct injection of hydrogen at high engine speed/torque to mitigate knock may be desirable. Additionally or alternatively, a fuel with a lower combustibility, such as ammonia, may be premixed with hydrogen to mitigate knock.

Furthermore, a type of gas used may determine whether direct injection of the fuel may include HPDI or LPDI, or both HPDI and LPDI. For example, hydrogen, when stored as a compressed gas, may be injected by HPDI or by LPDI, depending on engine load and available delivery pressure. Injection by HPDI may include injection at a pressure range of 300-700 bar while injection by LPDI may include injection at a pressure in a range of from about 10 bar to about 300 bar, as an example. In particular, HPDI of hydrogen may alleviate knock due to continuous burning of the hydrogen as the hydrogen mixes in the engine cylinders. Furthermore, HPDI may enable greater substitution rates of hydrogen, e.g., substituting for diesel, for example, thereby decreasing hydrocarbon and particulate matter emissions during engine operation.

The engine is coupled to an electric power generation system, which includes an alternator/generator 122 and electric traction motors 124. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels 116 to provide tractive power to propel the locomotive. One example locomotive configuration includes one traction motor per wheel. As depicted herein, six pairs of traction motors correspond to each of six pairs of wheels of the locomotive.

The locomotive may have one or more turbochargers 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive may include an exhaust gas recirculation (EGR) system 170. The EGR system may route exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., NOx). The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger. Additionally, the EGR system may be a donor cylinder EGR system where one or more cylinders provide exhaust gas only to the EGR passage, and then to the intake.

The locomotive may include an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF can trap particulates, also known as particulate matter (an example of which is soot), produced during combustion, and may be ceramic, silicon carbide, or a suitable material. In other embodiments, the exhaust gas treatment system may additionally include a selective catalytic reduction (SCR) catalyst, three-way catalyst, NO trap, various other emission control devices or combinations thereof. In some embodiments, the exhaust gas treatment system may be positioned upstream of the turbocharger, while in other embodiments, the exhaust gas treatment system may be positioned downstream of the turbocharger.

In some examples, as shown in FIG. 2, the electric traction motors may additionally receive electrical energy from a fuel cell power module 150. The fuel cell power module may include a fuel cell stack that receives hydrogen from one of the fuel reservoirs. The fuel cell power module may receive the second fuel from the second fuel reservoir when the second fuel is hydrogen. In other examples, the fuel cell power module may instead receive fuel from the first fuel reservoir or from the one or more fuel reservoirs of the fuel tender (e.g., of FIG. 3).

Electrical energy generated by the fuel cell power module 150 may be transmitted to a traction inverter 152 which may convert the electrical energy into a suitable for use by the electric traction motors. For example, the traction inverter may enable direct current (DC) power to alternating current (AC) power conversion. The traction inverter may be electrically coupled to other electrical components of the locomotive that are not shown in FIG. 2 for brevity. For example, the traction inverter may convert electrical electricity delivered to and from an electrical storage device, such as a battery.

In some examples, the engine and the battery may be included in a hybrid engine system where the electric traction motors may be powered by both the engine and the battery. The battery may be used to both energize the electric traction motors and to store energy captured during, for example, regenerative braking operations, such as dynamic braking. In yet other examples, the hybrid engine system may also include the fuel cell power module, and power for vehicle propulsion may be provided by each of the engine, the battery, and the fuel cell power module individually or in various combinations. For example, the hybrid engine system may be operated in an engine-only mode, a battery-only mode, a fuel cell-only mode, or obtain power from a power-split operation mode including combined power delivery from the engine and battery, from the engine and fuel cell, etc.

The locomotive may further include a throttle 142 coupled to the engine to indicate power levels. In this embodiment, the throttle is depicted as a notch throttle. However, any suitable throttle is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In other embodiments, the consist controller may determine a trip plan (e.g., a trip plan may be generated using trip optimization software, such as Trip Optimizer system (available from Wabtec Corporation) and/or a load distribution plan may be generated using consist optimization software such as Consist Manager (available from Wabtec Corporation) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and the consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may receive signals from a variety of engine sensors 151, as further elaborated herein, in order to determine operating parameters and operating conditions, and correspondingly adjust various engine actuators 153 to control operation of the locomotive. For example, the engine controller may receive signals from various engine sensors including, but not limited to, engine speed, engine load, intake manifold air pressure, boost pressure, exhaust pressure, ambient pressure, ambient temperature, exhaust temperature, engine temperature, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to a control signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may push propulsion of the train and the locomotive at the front of the train may pull the train, particularly during uphill navigation. As such, a greater load may be placed on the pushing locomotive at the end of the train.

Turning now to FIG. 3, an embodiment of the fuel tender 160 of FIG. 1 is shown. As described above, the fuel tender includes the fuel storage reservoir, the controller 164, and an engine 302. The fuel tender may further include a first unit 304, which may be a device for controlling a temperature and pressure within the fuel storage reservoir. For example, when liquified hydrogen or LNG is stored in the fuel storage reservoir, the first unit may be a cryogenic unit. The fuel storage reservoir sizes and configurations may be selected based on end use parameters, may be removable from the fuel tender, and may be receive fuel from an external refueling station via port 306.

The fuel storage reservoir may supply fuel to a fuel modification unit 312. The fuel modification unit may adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives.

By supplying fuel from the fuel storage reservoir to the locomotive engines and the engine of the fuel tender, the fuel may be combusted by the engines distributed across the train. In another non-limiting embodiment, the fuel tender engine may generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one example the power conversion unit includes an alternator (not shown) that is connected in series to one or more rectifiers (not shown) that convert the alternator's AC electrical output to DC electrical power prior to transmission along the electrical bus. Based on a downstream electrical component receiving power from the electrical bus, one or more inverters may invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage reservoir, a pressure and temperature of the fuel modification unit, the fuel tender engine temperature, pressure, and load, compressor pressure, heating fluid temperature and pressure, ambient air temperature, and the like. In one example, the fuel tender controller may execute code to auto-stop, auto-start, operate and/or tune the engine and the fuel modification unit in response to one or more control system routines. The computer readable storage media may execute code to transmit to and receive communications from the engine controllers on-board the locomotives.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other device and mechanisms for controlling fuel delivery and storage conditions, etc.

As described above, direct injection of hydrogen may alleviate issues associated with hydrogen combustion at lower pressure and with pre-mixing, such as auto-ignition and knock. In particular, HPDI of hydrogen during high engine powers and high ambient temperatures may desirable. At lower engine loads and lower ambient temperatures, LPDI or port injection (PI) may provide sufficient power output to meet a power demand without incurring higher likelihoods of auto-ignition and knock. The mechanisms for the injection modes e.g., direct injection (including HPDI and LPDI) and PI, for a dual pressure fueling system, as described herein, are illustrated in FIG. 4.

Figure 4:
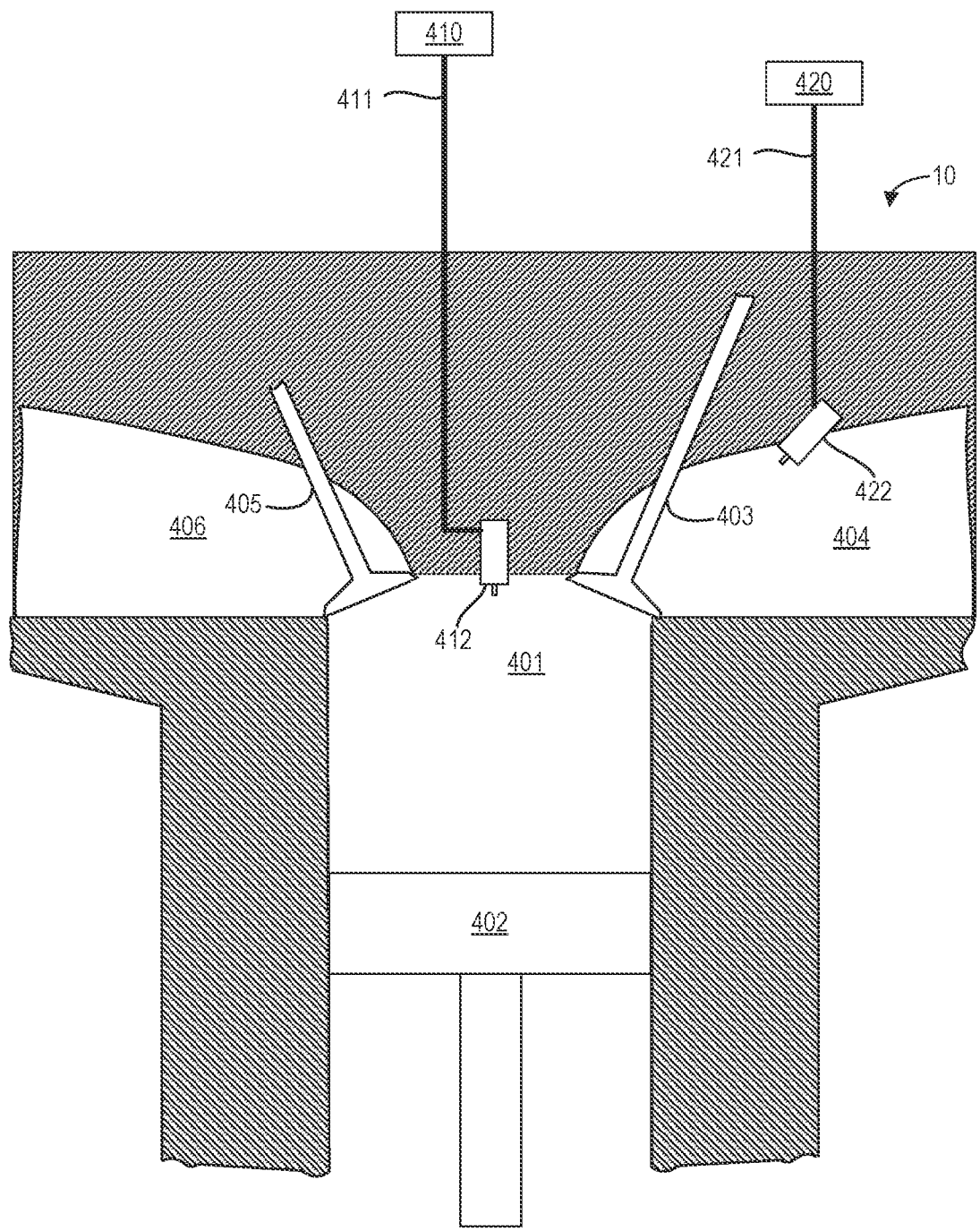
FIG. 4 shows an example of a combustion chamber adapted for a dual pressure fueling system.

Turning now to FIG. 4, it shows an example cylinder 401 of the engine. The cylinder may be one of a plurality of cylinders that each include at least one intake valve 403 and at least one exhaust valve 405. The cylinder may receive hydrogen for injection at dual pressures, including a high pressure (e.g., for HPDI) and a low pressure (e.g., for LPDI and/or PI). Each of the plurality of cylinders may include at least one direct injector 412 and at least one port injector 422. In some examples (not shown in FIG. 4), the cylinder may include individual direct injectors for each of HPDI and LPDI. Each fuel injector may include an actuator that may be actuated via a signal from the engine controller, e.g., the engine controller 12 of FIGS. 1 and 2. The cylinders of the engine may receive fuel from one or more fuel systems based on operating conditions. The fuel systems may include one or more fuel lines fluidly coupling a fuel tank, a pump, and a fuel rail to one or more of the direct injector and the port injector. More specifically, the direct injector may receive fuel from a first fuel system 410 via a first fuel conduit 411. The port-fuel injector may receive fuel from a second fuel system 420 via a second fuel conduit 421. The first fuel system and the second fuel system may each include one of the fuel reservoirs. In one example, the first fuel system and the second fuel system may deliver different fuels to the cylinder. In other examples, the first fuel system and second fuel system may deliver the same fuel to the cylinder.

The first fuel system may supply a carbon-based fuel and the second fuel system may supply a carbon-free fuel, in one example, or, alternatively, the first fuel system may supply the carbon-free fuel and the second fuel system may be supply the carbon-based fuel. The carbon-based fuel may include one or more of gasoline, diesel, biodiesel, natural gas, HDRD, ether, syn-gas, kerosene, and alcohol. The carbon-free fuel may include one or more of ammonia, hydrogen, and water. In some examples, the engine may be a spark-free engine. In other examples, the engine may be a spark-ignited engine.

In one example, the engine may combust one or more fuel types delivered thereto. For example, the direct injector may inject a first fuel from the first fuel system directly to the cylinder and the port-fuel injector may inject a second fuel from the second fuel system directly into an intake port 404. In one example, the first fuel is injected as a liquid fuel and the second fuel is injected as a gaseous fuel. In another example, both the first fuel and the second fuel may be injected as the gaseous fuel. The first fuel and second fuel may mix within an interior volume of the cylinder defined by cylinder walls, a cylinder head, and a piston 402. Following combustion, the exhaust valve may expel combustion products from the cylinder to an exhaust port 406.

During operation, each cylinder within the engine may use a four stroke cycle via actuation of the piston along an axis. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is typically referred to by those of skill in the art as top dead center (TDC).

When direct injection is applied, fuel is introduced into the combustion chamber, e.g., by the direct injector. Alternatively, when PI is used, fuel is introduced to the intake port, e.g., by the port injector, and mixed with air before being drawn into the combustion chamber past the intake valve when the intake valve is lifted. In some examples, fuel may be injected to the cylinder a plurality of times during a single cylinder cycle.

In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

An ignition timing of the engine may be adjusted via adjusting one or more of an intake valve timing, a fuel injection timing, a fuel temperature, a fuel pressure, an engine speed, an engine load, an air temperature, an engine temperature, a spark-timing, and boost pressure and/or manifold pressure. The ignition timing may be based on a position of the piston during the engine cycle and may be desired at or near TDC of a combustion stroke. A more advanced ignition timing may include where the ignition timing is moved prior to TDC of the combustion stroke and a more retarded ignition timing may include where the ignition timing is moved after TDC of the combustion stroke.

Direct injection may include both LPDI and HPDI. For example, the direct injector may be adapted as a high pressure injector for HPDI for injection at pressures in a range of from about 300 bar to about 700 bar or may inject fuel at lower pressures, such as below about 300 bar, via LPDI. In some examples, the direct injector may capable of both HPDI and LPDI. In contrast, PI relies on fuel injection at lower pressures than for direct injection, such as below 10 bar. For engines that have both direct injection and PI, HPDI of fuel may be desirable during engine operation at high power/loads and high ambient temperature while LPDI or PI may be used for engine operation at part-loads and moderate ambient temperatures.

When the engine can combust hydrogen direct injection of hydrogen may need controls to achieve desired operating performance. For example, pre-mixing of hydrogen, e.g., by PI, may increase a likelihood of knock. Knock is more likely to occur when engine power output is high. By delivering hydrogen to the engine via HPDI, hydrogen may burn as a diffusion flame, with an oxidizer (e.g., oxygen) and a fuel (e.g., hydrogen) are separated prior to combustion. The fuel burns as it mixes with the air at a flame front. This may mitigate pre-ignition and knock. The multi-fuel engine, using HPDI of hydrogen, may enable relatively higher substitution ratios of hydrogen for another, carbon-based fuel. The higher substitution ratios may thereby decrease carbon emissions without imposing an increased predisposition to knock.

As described above, use of HPDI may demand high pressure delivery of the fuel to the engine. For hydrogen, storage as a liquid may demand, in addition to cryogenic storage techniques, implementation of a high pressure liquid hydrogen pump which may be costly and currently not available commercially. Storage and delivery of hydrogen in a gaseous phase may be desired. When stored in the gaseous phase, high pressure delivery of hydrogen may be enabled using high pressure gas pumps or by storing hydrogen at high pressure, such as in high pressure cylinders that can store compressed gas. As high pressure gas pumps may be associated with pressure losses, high pressure storage of hydrogen, and delivery of hydrogen to the engine based on the storage pressure, may provide an efficient strategy for maintaining the gas pressure sufficiently high.

For example, to meet a HPDI delivery pressure threshold (such as between about 300 bar and about 700 bar) storage of hydrogen at a fuel storage reservoir may be divided amongst one or more fuel storage tanks which may each be pressurized to at least the delivery pressure threshold. As described above, each of the fuel storage tanks may be a gas tank or cylinder that can store a reservoir of compressed hydrogen. As hydrogen is drawn from one of the fuel storage tanks and combusted at the engine during operation, hydrogen is consumed and an internal pressure of the fuel storage tank may decrease. As combustion continues, the fuel storage tank internal pressure may drop below the delivery pressure threshold, leading to termination of HPDI of hydrogen from the fuel storage tank.

The fuel tank, and thus the hydrogen reservoir, may include or be coupled to a solid hydrogen generator. The solid hydrogen generator may include a solid hydrogen source. The solid hydrogen source can include a solid hydride, such as a hydride salt an aluminum hydride, or a borohydride. A suitable hydride salt may include an alkali or alkaline earth hydride. A suitable borohydride can be lithium borohydride, sodium borohydride, potassium borohydride, or mixtures of two or more thereof. The solid hydride form can be a pellet, tablet, cylinder, layer, or tube. The solid hydride can be combined with a wicking material. For example, the solid hydrogen source can be a blend of the wicking material with the solid hydride. The wicking material can include a catalyst. A proton source may be provided that is capable of reacting within the solid hydrogen source to form hydrogen gas. For example, a suitable proton source can include water. The fuel tank may be replenished with hydrogen from the hydrogen generator.

Figure 5:
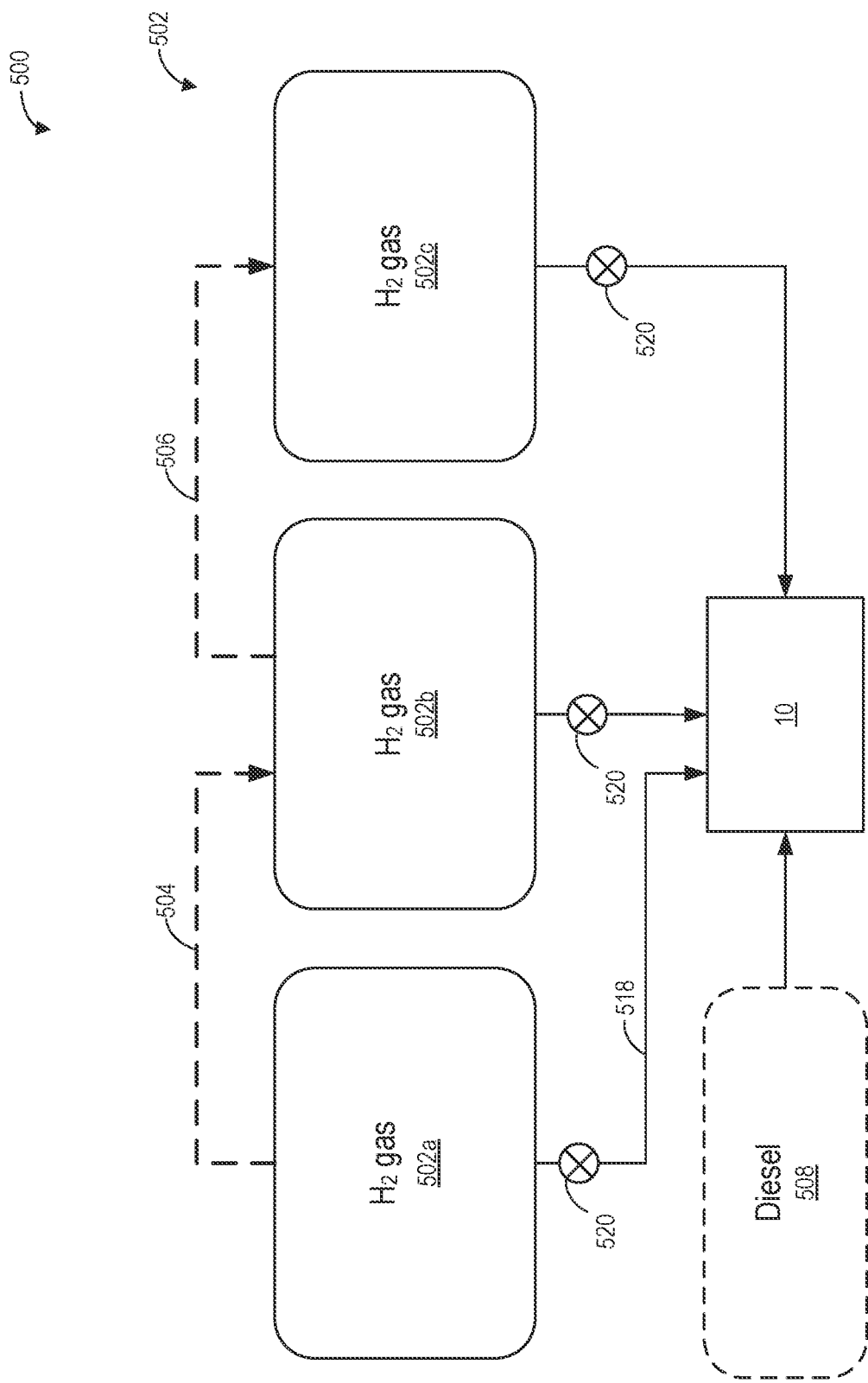
FIG. 5 shows a first example of a fuel reservoir enabling the dual pressure fueling system to be used for injection of hydrogen.

Pressure control strategies and techniques may be used, as described herein, to address a loss of pressure at the fuel reservoirs that may constrain use of the fuel reservoirs for HPDI. The strategies and techniques may include methods for maintaining a high delivery pressure from the fuel storage tanks by, for example, selective use of the fuel storage tanks based on pressure, redistribution of pressure amongst the fuel storage tanks, incorporation of an additional pump, matching injection mode to a suitable fuel storage tank based on pressure, etc. Fuel injection via a dual pressure fueling system is thereby enabled. In one example, as depicted in FIG. 5, a first configuration of a fuel reservoir 500 may include a plurality of high pressure (HP) hydrogen tanks 502. The fuel reservoir may be any of the fuel reservoirs disposed in a locomotive and/or a fuel tender. The plurality of HP hydrogen tanks includes a first tank 502a, a second tank 502b, and a third tank 502c, each tank can store hydrogen gas at pressures above a threshold minimum pressure for HPDI. An example threshold minimum pressure may be about 300 bar. In other examples, however, the fuel reservoir may include more or less than three tanks. Each of the tanks may be coupled to the engine via suitable high pressure gas lines 518, valves 520, manifolds (not shown), etc., extending between the tanks and each of HP direct injectors, low pressure (LP) direct injectors and port injectors of the engine, such as the direct injector and the port injector.

Hydrogen may be sequentially supplied to the engine from the plurality of hydrogen tanks for HPDI during high power engine operation. For example, hydrogen may be delivered to the HP direct injectors from the first tank. While the first tank is fluidically coupled to the HP direct injectors, flow of hydrogen from the second and third tanks may be inhibited, e.g., by closing valves controlling gas flow from the tanks. As hydrogen from the first tank is combusted at the engine, a pressure in the first tank may decrease until the pressure falls below a threshold minimum pressure for HPDI, such as 300 bar. As indicated by dashed arrow 504, the second tank may be fluidically coupled to the HP direct injectors, e.g., by opening the one of valves controlling gas flow from the tanks, and flow from the first tank may be blocked.

Hydrogen may be supplied from the second tank until a pressure of the second tank drops below the threshold minimum pressure for HPDI. Flow of hydrogen from the second tank may be discontinued and the third tank may instead be used to provide hydrogen for HPDI, as indicated by dashed arrow 506. As such, each tank of the fuel reservoir may be used for HPDI until the pressure of the tank is drawn down below the threshold minimum pressure for HPDI.

Each tank of the plurality of hydrogen tanks that is no longer able to provide HPDI may be subsequently used to deliver fuel for PI. The remaining pressure in the tanks, however, may be much higher than the target delivery pressure for PI, such as 10 bar and below. A mechanism or device (not shown in FIG. 5) for venting pressure may be employed, such as the fuel modification unit, to reduce the gas pressure relative to the tank pressure prior to injection at the engine. In some examples, the released pressure may be harvested, e.g., recuperated, and stored as electrical energy at an energy storage device, such as a battery, and/or used to power other operations.

In another example, when the tank pressure falls below the threshold minimum pressure but is well above the delivery pressure for PI, the tank may be used to provide hydrogen for LPDI. Injection of hydrogen via LPDI may be desirable during engine operation at part-loads due to lower cylinder pressures to be overcome. When high engine loads are demanded and HPDI of hydrogen is not available, hydrogen may instead be injected via PI, with pressure modification as described above.

In yet another example, the engine may be the multi-fuel engine, configured to combust at least one fuel in addition to hydrogen. Hydrogen may be similarly delivered to the engine by LPDI at part-loads and by PI at high loads when the tank pressure falls below the threshold minimum pressure for HPDI. For example, the engine may burn diesel as well as hydrogen, where hydrogen is used to supplement diesel combustion by substituting a portion of the diesel. Injection by PI at high loads includes injecting hydrogen at a lower substation ratio than during injection by LPDI at part-loads, thereby accommodating an increased likelihood of knock at high loads. The diesel may be supplied by a diesel tank 508, as shown in FIG. 5, which may be stored at a locomotive and/or a fuel tender.

When HPDI is available, at high engine loads, a first substitution ratio, e.g., a ratio of hydrogen to diesel, may be used and at low engine loads, a second substitution ratio may be used. The second substitution ratio may be higher than the first substitution ratio and may include HPDI of hydrogen from a tank with sufficient pressure to allow HPDI. As an example, the first substitution ratio may be 40:60 hydrogen to diesel, where the hydrogen may be hydrogen introduced to the engine by PI. The second substitution ratio may be 40:55:5 or 40:60:0, for example, of port injected hydrogen to HP direct injected hydrogen to diesel. By adjusting the substitution ratio according to engine load as described above, a likelihood of knock may be reduced while carbon-based emissions may be minimized for the multi-fuel engine.

In some instances, when at least one tank of the plurality of tanks has sufficiently high pressure to enable HPDI, engine operation may include switching from HPDI to LPDI according to operating conditions, in spite of available high pressure for HPDI. For example, the operating conditions may include engine power, ambient conditions such as temperature, barometric pressure, humidity, available fuel pressure and/or remaining fuel quantity. As an example, when high power engine operation is demanded and a remaining quantity of stored hydrogen is below 50% of maximum fuel storage capacity, injection via HPDI may be metered according to a set trip plan and anticipated engine operating conditions over the trip. Injection by HPDI may be conserved and constrained to conditions where HPDI may be most beneficial for engine performance, emission control, etc., and LPDI may be used whenever possible.

Figure 6:
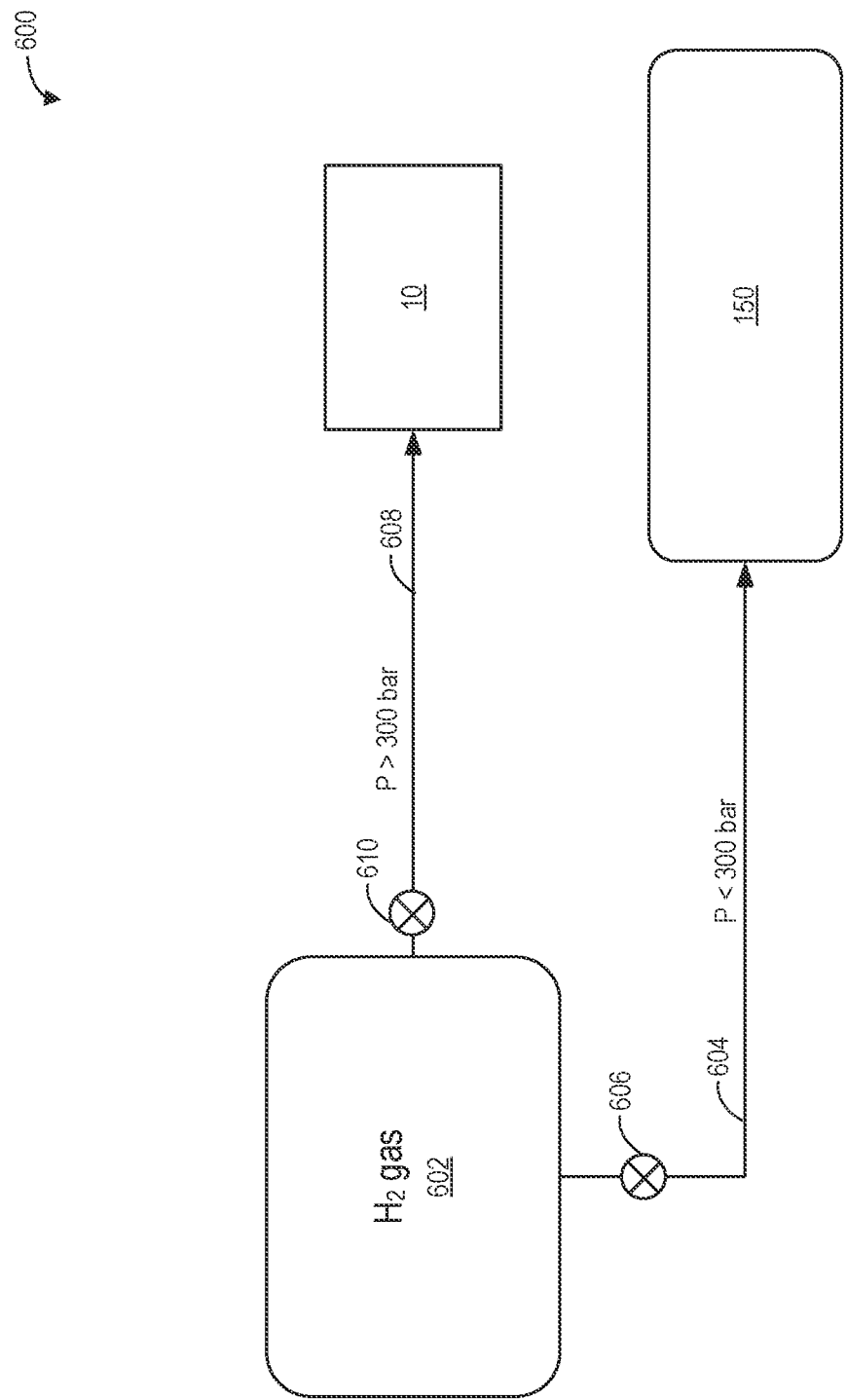
FIG. 6 shows a second example of a fuel reservoir enabling the dual pressure fueling system to be used for injection of hydrogen.

In some examples, the locomotive may be additionally powered by a fuel cell system, including a fuel cell power module such as the fuel cell power module 150 of FIG. 2. For example, a second example of a fuel reservoir 600 is depicted in FIG. 6, including one or more hydrogen tanks 602, which may be similar to any of the plurality of hydrogen tanks 502 of FIG. 2, and shown schematically as a single tank for brevity. The one or more hydrogen tanks 602 may be coupled to direct injectors and port injectors of the engine via gas lines 604, valves 606, and manifolds suitable for HPDI and also coupled to the fuel cell power module 150 via gas lines 608, valves 610, and manifolds (not shown) suitable for LPDI.

As operation of the fuel cell power module demands lower hydrogen pressures than fuel combustion via HPDI, one strategy for addressing loss of pressure at the hydrogen tanks may include directing the remaining hydrogen in the tanks to the fuel cell system. As shown in FIG. 6, hydrogen may be delivered to the engine from one of the hydrogen tanks, the hydrogens tanks initially storing hydrogen gas at pressure sufficient for HPDI, until a pressure of the tank falls below the threshold minimum pressure for HDPI (e.g., 300 bar). A different, higher pressure tank may then be used to provide high pressure hydrogen for HDPI and the partially spent tank may instead be used to deliver hydrogen to the fuel cell power module. The partially spent tank may supply hydrogen to the fuel cell power module until the tank pressure falls below a threshold minimum pressure for operating the fuel cell system. Below the threshold minimum pressure for fuel cell operation, the partially spent tank may be used for PI.

In another example, a compact pump may be implemented to modify a delivery pressure of hydrogen. As illustrated in FIG. 7, a third example of a fuel reservoir 700 for a vehicle, such as a locomotive, may include one or more hydrogen tanks 702, represented schematically as a single tank for brevity, coupled to injectors (e.g., direct injectors and port injectors) of the engine via each of a first path 704 and a second path 706. Hydrogen may be stored as a liquid or a compressed gas, e.g., at pressures sufficiently for HPDI, in the one or more hydrogen tanks. The first path includes a high pressure (HP) booster pump 708 while the second path does not include any additional devices between the hydrogen tanks and the engine.

When hydrogen is stored as the compressed gas, the HP booster pump may be selectively activated to boost a pressure of hydrogen provided by one of the hydrogen tanks to the engine through the first path. For example, hydrogen for HPDI may be provided by the hydrogen tank until a pressure of the hydrogen tank falls below the threshold minimum pressure for HPDI. The HP booster pump may then be used to raise the hydrogen pressure from the partially depleted hydrogen tank prior to injection at the engine. As an example, the pressure of the partially depleted hydrogen tank may drop to about 50 bar. The booster pump may pump the pressure of the hydrogen, upon delivery to the engine, to about 350 bar. This may allow the hydrogen to be used for HPDI. When HPDI is not demanded, e.g., when PI of hydrogen is suitable for engine operation, hydrogen may be delivered from the partially depleted hydrogen tank without boosting the pressure via the second path. In some examples, hydrogen may also be flowed to the engine through the second path for LPDI, provided the pressure at the partially depleted hydrogen tank is sufficiently high. By operating the HP booster pump only when HPDI is demanded, a smaller, more compact, and less costly pump may be used which may alleviate issues with poor efficiency and/or reliability associated with larger pumps. Furthermore, use of a hydrogen tank for HPDI may continue even after the tank pressure drops below the threshold minimum pressure for HPDI, thereby prolonging a duty cycle of the tank for HPDI.

A pump may redistribute hydrogen gas between tanks to raise a pressure in at least one tank. For example, as shown in FIG. 8 in a fourth example of a fuel reservoir 800 for a vehicle, a pump 802 may fluidically couple a plurality of hydrogen tanks 804 to one another via gas lines 806. The gas lines may include various valves and other components for controlling gas flow in high pressure lines not shown in FIG. 8 for brevity.

The plurality of hydrogen tanks includes at least a first tank 804a, a second tank 804b, and a third tank 804c, although the plurality of hydrogen tanks may include more or less than three tanks, in other examples. The plurality of hydrogen tanks may all initially store compressed hydrogen gas at sufficiently high pressure for HPDI and may be used sequentially to deliver hydrogen to the engine, in one example. For example, the first tank may supply hydrogen to the engine for HPDI until a pressure of the first tank falls below the threshold minimum pressure for HPDI. Flow from the first tank for HPDI may be terminated and hydrogen is instead drawn from the second tank until a pressure of the second tank drops to below the threshold minimum pressure for HPDI. High pressure hydrogen for HPDI is then provided by the third tank.

The pump may be operated to pump hydrogen from the second tank to the first tank or from the first tank to the second tank to increase a pressure at a receiving tank (e.g., the tank that is receiving hydrogen from the other tank). By redistributing hydrogen between tanks no longer able to deliver hydrogen at pressures enabling HPDI, at least one of the tanks is returned to sufficient pressure for HPDI. The pump may be used to redistribute hydrogen from more than one tank to the receiving tank. For example, hydrogen from two, three, four, etc., tanks at lower pressure than the threshold minimum pressure for HPDI may be transferred to the receiving tank to boost pressure in the receiving tank.

In some examples, the pump may be driven by excess braking energy, such as from dynamic braking. A pumping penalty effect on vehicle efficiency may thereby be minimized. In other examples, energy may be captured from pressure release operations, e.g., as described above for using tanks at pressures below the threshold minimum pressure for HPDI but higher than pressure used for PI, for decreasing a delivery pressure of hydrogen to a suitable pressure for PI, to power operation of the pump.

In addition to strategies including sequential hydrogen delivery from a plurality of hydrogen tanks, selective usage of hydrogen tanks based on available pressure, and incorporation of a pump to boost hydrogen delivery pressure or redistribute hydrogen amongst the plurality of hydrogen tanks, other mechanisms for maintaining hydrogen storage pressure at or above a threshold minimum pressure for HPDI are possible. The other mechanisms may further enable implementation of a dual pressure fueling system at an engine that can combust hydrogen. For example, an example of a hydrogen tank 900 for storing compressed hydrogen gas at pressures sufficiently high for HPDI is shown in FIG. 9. The hydrogen tank includes an internal, movable barrier 902 which divides an inner volume of the hydrogen tank into a first portion 904 and a second portion 906.

Depiction of the movable barrier may represent different types of volume-occupying or volume-adjusting mechanisms. In a first example, the movable barrier may be a mechanical interface between hydrogen gas and an incompressible substance, such as a liquid. For example, the mechanical interface may be a diaphragm, a bladder, an accordion-style bellows, etc. The liquid may be a nonreactive liquid, such as water. The liquid may be injected into the hydrogen tank through a port 908, as indicated by arrow 910, to occupy at least a portion of the inner volume of hydrogen tank, such as the second portion. By adding the liquid to the hydrogen tank the movable barrier is forced to slide as indicated by arrows 912. Hydrogen in the first portion is compressed, and a pressure of the hydrogen rises.

The hydrogen tank may initially be filled only with hydrogen gas, at a pressure above the threshold minimum pressure for HPDI. When the pressure in the hydrogen tank falls below the threshold minimum pressure, the liquid may be added to return the pressure back to a level above the threshold minimum pressure. Implementation of a liquid pump for adding the liquid to the hydrogen tank may be less costly and more robust than HP pumps for gas or for cryogenic liquids. Use of the liquid to control pressure within the hydrogen tank may therefore be a cost effective, efficient technique for pressure loss compensation. Alternatively, the movable barrier may be a mechanical device, such as a spring-loaded accordion-style bellows, or some other type of mechanical device able to exert enough force to compress the remaining hydrogen in the hydrogen tank.

In this way, fuel injection at an engine of a vehicle via a dual pressure fueling system may be enabled by controlling a hydrogen delivery pressure. The hydrogen delivery pressure may be a pressure of fuel provided to a fuel injection system, e.g., a fuel rail pressure immediately upstream of fuel injectors of an engine. The hydrogen delivery pressure may correspond to a storage pressure of hydrogen, thus the storage pressure directly controls the delivery pressure. By storing hydrogen at pressures high enough for direct injection, hydrogen may thereby be injected by direct injection, as well as port injection. The hydrogen delivery pressure may be modulated based on strategies for storing hydrogen on-board the vehicle, thereby allowing hydrogen to be provided to the engine at a pressure suitable for a desired injection mode. For example, different mechanisms for maintaining the delivery pressure sufficiently high for direct may include actuation of valves, such as the valves 520 of FIG. 5 and valves 606 and 610 of FIG. 6, controlling flow of hydrogen from hydrogen storage tanks to one or more of the engine and a fuel cell system, as well as pumps, such as pump 708 of FIG. 7 and pump 802 of FIG. 8, for adjusting the hydrogen delivery pressure.

Various methods for controlling and modifying the hydrogen delivery pressure may be implemented, including drawing sequentially from a plurality of high pressure hydrogen storage tanks and utilizing a pump to boost the delivery pressure from tanks with pressures falling below a minimum pressure demanded for HPDI. In some examples, storage tanks no longer able to provide hydrogen at pressures sufficiently high for HPDI may be opportunistically used to supply hydrogen for other fuel injection modes, such as PI and LPDI as well as for other propulsion power sources, such as fuel cell systems. By providing suitable hydrogen storage for injection by HPDI, costs may be maintained low and issues associated with pre-mixing of hydrogen, such as pre-ignition and knock, may be mitigated. Furthermore, higher substitution ratios of hydrogen for a carbon-based fuel in multi-fuel engines, may be enabled. Having more non-carbon fuel consumed may decrease carbon emissions during engine operation while maintaining the power output level.

An example of a method 1000 for operating an engine that can receive fuel via a dual pressure fueling system is shown in FIG. 10. The engine may be installed in a vehicle and may include one or more cylinders. The dual pressure fueling system may provide hydrogen to the engine at high pressure for HPDI and low pressure for LPDI and/or PI from a fuel tank or reservoir. The fuel reservoir may be in one or more storage tanks that can store hydrogen gas at high pressure or as liquid hydrogen. Furthermore, one or more of the storage tanks may include a mechanism to increase a pressure of the storage tanks. Instructions for carrying out the method may be executed by a controller having a plurality of processors based on instructions stored on a memory of the controller and in conjunction with signals received from sensors of the engine system. The controller may employ engine actuators of the engine system to adjust engine operation, according to the methods described below.

At step 1002, the method includes estimating and/or measuring vehicle operating conditions. For example, engine speed, load, power output, an engine coolant temperature, etc., may be determined based on signals from engine sensors. Ambient conditions affecting engine operation, such as barometric pressure, ambient temperature and humidity, may be monitored and other parameters such as fuel level and fuel pressure at storage tanks may be confirmed.

The method includes determining if fuel injection by HPDI is indicated at step 1004. Conditions where HPDI is advantageous, with respect to combustion efficiency, power output, minimizing carbon emissions, etc., may be determined by the controller based on engine operating conditions. For example, HPDI may be preferred over LPDI or PI when engine loads and ambient temperature are high. If fuel injection by HPDI is not indicated, e.g., engine loads and ambient temperature are moderate or low, the method continues to step 1006 to continue engine operation under the current conditions, including injecting hydrogen via modes other than HPDI. Hydrogen may be delivered from a tank with lower internal pressures than demanded for HPDI and adjustment of the pressure to a suitable pressure (e.g., venting or released pressure) may be enabled by a fuel modification unit. The method may return to the start.

If fuel injection by HPDI is indicated, the method proceeds to step 1008 to deliver hydrogen from a storage tank of the fuel reservoir. The storage tank may be selected based on pressure, e.g., an internal pressure of the storage tank is at least at the minimum pressure for HPDI, and hydrogen may be flowed from the tank to injectors at the engine at a delivery pressure similar to the internal pressure of the storage tank. The hydrogen may be injected at HP direct injectors into the engine cylinders.

At step 1010, the method includes confirming if the internal pressure of the storage tank is above a threshold. The threshold may be the minimum pressure enabling HPDI, such as 300 bar. If the pressure at the storage tank does fall drop to or below the threshold, the method returns to step 1004 to confirm if HPDI is still desired. If the pressure does decrease to or below the threshold, the method proceeds to step 1012 to apply a strategy for mitigating disabling of HPDI due to pressure loss. For example, the strategy may include one or more of switching to a different storage tank with sufficiently high pressure, activating a booster pump to increase a delivery pressure from the storage tank (e.g., the partially spent storage tank), switching to a new storage tank with sufficiently high pressure and using a pump to redistribute hydrogen from one partially spent tank into another partially spent storage tank to return an internal pressure of one of the partially spent storage tanks to a level above the threshold, etc.

In addition, a mechanism for increasing the internal pressure of the storage tank may be employed, such as adding a liquid to the tank or moving a movable barrier within the tank to reduce a storage volume of the hydrogen, thereby raising the hydrogen pressure. Storage tanks with internal pressure lower than the threshold may be used for lower pressure fuel injection, such as LPDI and PI or to provide hydrogen to a fuel cell system, if included in the vehicle. The method returns to the start.

As used herein, an element or step recited in the singular and proceeded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is means plus or minus five percent of a given value or range unless otherwise indicated.

The disclosure also provides support for a method for an engine, comprising: providing a first fuel delivery pressure enabling high pressure direct injection of a fuel via a first fuel injector and a second fuel delivery pressure, insufficient for high pressure direct injection, via a second fuel injector, based on engine operation. In a first example of the method, providing the first and second fuel delivery pressures includes modulating a pressure of hydrogen delivered to the engine. In a second example of the method, optionally including the first example, modulating the pressure of hydrogen delivered to the engine includes increasing a substitution ratio of hydrogen in a fuel mixture combusted at the engine, the fuel mixture including hydrogen and a carbon-based fuel when the hydrogen is injected at the engine by high pressure direct injection. In a third example of the method, optionally including one or both of the first and second examples, the method further comprises: injecting the fuel at the engine by one of low pressure direct injection and port injection when a pressure of the fuel is at the second fuel delivery pressure. In a fourth example of the method, optionally including one or more or each of the first through third examples, providing the first and second fuel delivery pressures includes drawing the fuel sequentially from a plurality of fuel storage tanks for high pressure direct injection, the plurality of fuel storage tanks storing the fuel at the first fuel delivery pressure, and wherein drawing the fuel sequentially from the plurality of fuel storage tanks includes flowing the fuel from a first fuel storage tank of the plurality of fuel storage tanks storing the fuel at the first fuel delivery pressure until a pressure of the first fuel storage tank decreases to the second fuel delivery pressure and then drawing the fuel from a second fuel storage tank of the plurality of fuel storage tanks storing the fuel at the first fuel delivery pressure for high pressure direct injection. In a fifth example of the method, optionally including one or more or each of the first through fourth examples, the method further comprises: flowing the fuel from the first fuel storage tank, after the pressure of the first fuel storage tank decreases to the second fuel delivery pressure, to the engine for low pressure direct injection when engine load is moderate and for port injection when the engine load is high. In a sixth example of the method, optionally including one or more or each of the first through fifth examples, providing the first and second fuel delivery pressures includes using a pump to increase a pressure of the fuel when an internal pressure of a fuel storage tank providing the fuel to the engine for high pressure direct injection decreases to the second fuel delivery pressure. In a seventh example of the method, optionally including one or more or each of the first through sixth examples, providing the first and second fuel delivery pressures includes using a pump to redistribute fuel from a first fuel storage tank, the first fuel storage tank storing fuel at the second fuel delivery pressure, to a second fuel storage tank, also storing the fuel at the second fuel delivery pressure, to increase an internal pressure of the second fuel storage tank to the first fuel delivery pressure. In an eighth example of the method, optionally including one or more or each of the first through seventh examples, providing the first and second fuel delivery pressures includes selectively injecting the fuel by low pressure direct injection over high pressure direct injection based on engine operating conditions and wherein the engine operating conditions includes one or more of engine power, ambient conditions, available fuel pressure and remaining fuel quantity.

The disclosure also provides support for a multi-pressure fueling system for a vehicle, comprising: a first storage tank of a hydrogen reservoir configured to store hydrogen above a minimum threshold pressure for high pressure direct injection, an engine receiving the hydrogen from the first storage tank at one or more injectors, and a mechanism for maintaining a delivery pressure of the hydrogen to the engine at a pressure above the minimum threshold pressure for high pressure direct injection. In a first example of the system, the mechanism is a plurality of valves controlling delivery of the hydrogen from each of a plurality of storage tanks forming the hydrogen reservoir, the plurality of storage tanks including the first storage tank, and wherein the hydrogen is delivered sequentially from each of the plurality of storage tanks until a pressure of a respective storage tank decreases to or below the minimum threshold pressure for high pressure direct injection. In a second example of the system, optionally including the first example, the mechanism is a pump positioned between the first storage tank and the engine and wherein the pump is operated to increase the delivery pressure of the hydrogen received at the engine when a pressure of the first storage tank falls to or below the minimum threshold pressure for high pressure direct injection. In a third example of the system, optionally including one or both of the first and second examples, the mechanism is a pump fluidically coupled to each of a plurality of storage tanks forming the hydrogen reservoir, the plurality of storage tanks including the first storage tank, and wherein the pump is operated to redistribute the hydrogen from one of the plurality of storage tanks with a pressure below the minimum threshold pressure for high pressure direct injection to another of the plurality of storage tanks with a pressure below the minimum threshold pressure for high pressure direct injection. In a fourth example of the system, optionally including one or more or each of the first through third examples, the pump is powered by excess braking energy from the vehicle. In a fifth example of the system, optionally including one or more or each of the first through fourth examples, the vehicle includes a fuel cell system configured to receive the hydrogen at a lower pressure than the minimum threshold pressure for high pressure direct injection and wherein the hydrogen is delivered from the first storage tank to the fuel cell system when a pressure of the first storage tank decreases to below the minimum threshold pressure for high pressure direct injection. In a sixth example of the system, optionally including one or more or each of the first through fifth examples, the system further comprises: a fuel cell disposed on the vehicle and the multi-pressure fueling system is configured to supply hydrogen from the hydrogen reservoir to the fuel cell. In a seventh example of the system, optionally including one or more or each of the first through sixth examples, the hydrogen reservoir is coupled to a solid hydrogen generator.

The disclosure also provides support for a method for a multi-pressure fueling system for a vehicle, comprising: injecting hydrogen at an engine via a high pressure direct fuel injector to increase a substitution ratio of the hydrogen relative to a carbon-based fuel by maintaining a pressure at a hydrogen reservoir above a minimum threshold pressure for high pressure direct injection. In a first example of the method, injecting the hydrogen to increase the substitution ratio includes supplementing combustion of the carbon-based fuel with the hydrogen during operation of the engine at high loads and increasing the supplementing of the combustion of the carbon-based fuel with the hydrogen during operation of the engine at low loads using a combination of high pressure direct injection and port injection. In a second example of the method, optionally including the first example, maintaining the pressure at the hydrogen reservoir above the minimum threshold pressure includes increasing the pressure in the hydrogen reservoir using a movable barrier to reduce a storage volume of the hydrogen and wherein increasing the pressure using the movable barrier includes moving the movable barrier via addition of a liquid or a mechanical device.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

This written description uses examples to disclose the invention, including the best mode, and also to enable a person of ordinary skill in the relevant art to practice the invention, including making and using devices or systems and performing the incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, comprising:
storing a fuel in a storage tank at a pressure enabling high pressure direct injection of the fuel via a first fuel injector without boosting pressure via a pump;
providing a first fuel delivery pressure enabling high pressure direct injection of the fuel via the first fuel injector without boosting pressure via the pump until the pressure in the storage tank falls below a threshold; and
providing a second fuel delivery pressure, insufficient for high pressure direct injection, via a second fuel injector, after the pressure in the storage tank falls below the threshold even when the engine load is high.

2. The method of claim 1, wherein the second fuel injector is a port injector, the method further comprising providing the second fuel delivery pressure, insufficient for high pressure direct injection, via the first fuel injector, after the pressure in the storage tank falls below the threshold when the engine load is moderate, for low pressure direct injection without boosting pressure via the pump.

3. The method of claim 2, wherein providing the first and second fuel delivery pressures includes modulating a pressure of hydrogen delivered to the engine, and wherein modulating the pressure of hydrogen delivered to the engine includes increasing a substitution ratio of hydrogen in a fuel mixture combusted at the engine, the fuel mixture including hydrogen and a carbon-based fuel when the hydrogen is injected at the engine by high pressure direct injection.

4. The method of claim 1, further comprising flowing the fuel from the first fuel storage tank, after the pressure of the first fuel storage tank decreases to the second fuel delivery pressure, to the engine for low pressure direct injection when engine load is moderate and for port injection when the engine load is high.

5. The method of claim 1, further comprising, when high pressure direct injection is not demanded even when storing the fuel in the storage tank at the pressure enabling direct injection of the fuel via the first fuel injector without boosting pressure via the pump and with the tank partially depleted, delivering the fuel from the tank without boosting the pressure via the pump.

6. A method for an engine, comprising:
providing a first fuel delivery pressure enabling high pressure direct injection of a fuel via a first fuel injector and a second fuel delivery pressure, insufficient for high pressure direct injection, via a second fuel injector, based on engine operation, wherein providing the first and second fuel delivery pressures includes drawing the fuel sequentially from a plurality of fuel storage tanks for high pressure direct injection, the plurality of fuel storage tanks storing the fuel at the first fuel delivery pressure, and wherein drawing the fuel sequentially from the plurality of fuel storage tanks includes flowing the fuel from a first fuel storage tank of the plurality of fuel storage tanks storing the fuel at the first fuel delivery pressure until a pressure of the first fuel storage tank decreases to the second fuel delivery pressure and then drawing the fuel from a second fuel storage tank of the plurality of fuel storage tanks storing the fuel at the first fuel delivery pressure for high pressure direct injection, the method further comprising flowing the fuel from the first fuel storage tank, after the pressure of the first fuel storage tank decreases to the second fuel delivery pressure, to the engine for low pressure direct injection when engine load is moderate and for port injection when the engine load is high.

7. The method of claim 1, further comprising providing the first and second fuel delivery pressures using the pump to increase pressure of the fuel only when an internal pressure of the fuel storage tank providing the fuel to the engine for high pressure direct injection decreases below the threshold.

8. The method of claim 1, further comprising redistributing fuel from a first fuel storage tank, the first fuel storage tank storing fuel at the second fuel delivery pressure, to a second fuel storage tank, also storing the fuel at the second fuel delivery pressure, to increase an internal pressure of the second fuel storage tank to the first fuel delivery pressure.

9. The method of claim 1, further comprising selectively injecting the fuel by low pressure direct injection over high pressure direct injection based on engine operating conditions and wherein the engine operating conditions includes one or more of engine power, ambient conditions, available fuel pressure and remaining fuel quantity.

10. A multi-pressure fueling system for a vehicle, comprising:
a first storage tank of a hydrogen reservoir configured to store hydrogen above a minimum threshold pressure for high pressure direct injection;
an engine receiving the hydrogen from the first storage tank at one or more injectors without boosting pressure via a high pressure pump; and
a mechanism for maintaining a delivery pressure of the hydrogen to the engine at a pressure above the minimum threshold pressure for high pressure direct injection, including redistributing hydrogen storage pressure among a plurality of hydrogen storage tanks forming the hydrogen reservoir.

11. The multi-pressure fueling system of claim 10, wherein the mechanism is a plurality of valves controlling delivery of the hydrogen from each of the plurality of storage tanks forming the hydrogen reservoir, the plurality of storage tanks including the first storage tank, and wherein the hydrogen is delivered sequentially from each of the plurality of storage tanks until a pressure of a respective storage tank decreases to or below the minimum threshold pressure for high pressure direct injection.

12. The multi-pressure fueling system of claim 10, wherein the mechanism is a pump positioned between the first storage tank and the engine and wherein the pump is operated to increase the delivery pressure of the hydrogen received at the engine when a pressure of the first storage tank falls to or below the minimum threshold pressure for high pressure direct injection.

13. The multi-pressure fueling system of claim 10, wherein the mechanism is a pump fluidically coupled to each of the plurality of storage tanks forming the hydrogen reservoir, the plurality of storage tanks including the first storage tank, and wherein the pump is operated to redistribute the hydrogen from one of the plurality of storage tanks with a pressure below the minimum threshold pressure for high pressure direct injection to another of the plurality of storage tanks with a pressure below the minimum threshold pressure for high pressure direct injection.

14. The multi-pressure fueling system of claim 13, wherein the pump is powered by excess braking energy from the vehicle.

15. The multi-pressure fueling system of claim 10, wherein the vehicle includes a fuel cell system configured to receive the hydrogen at a lower pressure than the minimum threshold pressure for high pressure direct injection and wherein the hydrogen is delivered from the first storage tank to the fuel cell system when a pressure of the first storage tank decreases to below the minimum threshold pressure for high pressure direct injection.

16. The multi-pressure fueling system of claim 10, further comprising a fuel cell disposed on the vehicle and the multi-pressure fueling system is configured to supply hydrogen from the hydrogen reservoir to the fuel cell.

17. The multi-pressure fueling system of claim 10, wherein the hydrogen reservoir is coupled to a solid hydrogen generator.

\* \* \* \* \*